United States Patent [19]

Matsui et al.

[11] Patent Number: 4,843,415
[45] Date of Patent: Jun. 27, 1989

[54] AUTOMATIC FOCUS DETECTION SYSTEM

[75] Inventors: Toru Matsui, Sakai; Hiroshi Ueda, Habikino, both of Japan

[73] Assignee: Minolta Camera Kabushiki Kaisha, Osaka, Japan

[21] Appl. No.: 99,725

[22] Filed: Sep. 22, 1987

[30] Foreign Application Priority Data

Sep. 22, 1986 [JP] Japan ............................ 61-224113
Sep. 22, 1986 [JP] Japan ............................ 61-224114

[51] Int. Cl.⁴ .................................................. G03B 3/00
[52] U.S. Cl. ............................. 354/403; 354/195.1; 356/1
[58] Field of Search ............ 354/400, 402, 403, 195.1; 356/1

[56] References Cited

U.S. PATENT DOCUMENTS

| | | | |
|---|---|---|---|
| 3,435,744 | 4/1969 | Stimson | 354/403 |
| 3,442,193 | 5/1969 | Pagel | 354/403 |
| 3,443,502 | 5/1969 | Harvey | 354/403 |
| 3,653,762 | 4/1972 | Harvey | 356/4 |
| 4,032,934 | 6/1977 | Hendrickson et al. | 354/403 |
| 4,065,778 | 12/1977 | Harvey | 354/403 |
| 4,371,261 | 2/1983 | Tsuji | 356/1 |
| 4,459,004 | 7/1984 | Morizumi | 354/403 |
| 4,582,424 | 4/1986 | Kawabata | 356/1 |
| 4,643,555 | 2/1987 | Wakabayashi | 354/403 |
| 4,690,536 | 9/1987 | Nakai et al. | 354/402 |
| 4,690,538 | 9/1987 | Matsui et al. | 354/403 |
| 4,710,011 | 12/1987 | Ushiro | 354/403 |
| 4,720,724 | 1/1988 | Yokoo | 354/403 |

FOREIGN PATENT DOCUMENTS

| | | |
|---|---|---|
| 47-13282 | 7/1972 | Japan . |
| 58-201015 | 11/1983 | Japan . |
| 60-91315 | 5/1985 | Japan . |
| 60-16811 | 8/1985 | Japan . |

Primary Examiner—Russell E. Adams
Attorney, Agent, or Firm—Burns, Doane, Swecker & Mathis

[57] ABSTRACT

An automatic focus detection system for use in a camera system comprises focus detecting unit having one light receiving element corresponding to, in an objective field, a focus detection area whose center is deviated from the optical axis of the objective lens, the position of the focus detection area being changed in accordance with the change of the focal length of the objective lens; and a light projecting unit for projecting light towards the object field so that the region of the projected light covers the focus detection area, if the position of the focus detection area is changed in accordance with the change of the focal length of the objective lens.

11 Claims, 9 Drawing Sheets

4,843,415

AUTOMATIC FOCUS DETECTION SYSTEM

BACKGROUND OF THE INVENTION

1. Field of the Invention

The present invention relates to an automatic focus detection system for use in camera, and more particularly to an automatic focus detection system, in which the focusing condition of an objective lens with respect to an object is detected with illuminating the object, if the brightness of the object is lower than a predetermined level.

2. Description of the Prior Art

FIG. 1 shows a known construction of conventional automatic focusing camera in which the amount of defocus of the objective lens is calculated and the objective lens is automatically focused on the basis of the calculated result. In the figure, the light transmitted through an objective lens 601 is passed through a half-mirror 602, and then reflected by a reflection mirror 603 towards an image sensor 604 including a plurality of light receiving elements. The image sensor 604 receives an image of an object to be photographed by the objective lens 601, and the amount of defocus of the objective lens 601 is calculated in accordance with the position of the image formed on the image sensor 604, or with the contrast of the image. The objective lens 601 is automatically focused on the basis of the calculated amount of defocus. If the brightness of the object to be focused is lower than a predetermined level, a light source 605 provided in a camera body is actuated for projecting light towards the object through the projection lens 606. Here, a pattern plate, having a plurality of transparent portions and a plurality of opaque portions, is provided in front of the light source 605 for projecting a contrast pattern on the object, in order to make higher contrast on the object.

In such construction, the focus detection area on the object, in which the focusing condition of the objective lens is detected, is determined to be an area positioned on an optical axis of the objective lens. Such focus detection area is normally determined to be located so that it has a predetermined extent in a direction perpendicular to the optical axis of the objective lens with having its center arranged on the optical axis. Therefore, the position of the center of the focus detection area is kept on the optical axis even if the focal length of the objective lens is changed, although the size of the focus detection area on the object is changed in accordance with the change of the focal length of the objective lens. Thus, the light projected by the light source and the projection lens illuminates a predetermined area including the optical axis in spite of the change of the focal length of the objective lens.

However, a multi-point focus detection device having a plurality of focus detection areas on the object has at least one focus detection area whose center is not positioned on the optical axis. Such focus detection area is called "off-axis focus detection area" hereinafter. In such multi-point focus detection device, the position of the center of off-axis focus detection area is changed in addition to the change of its size, in accordance with the change of the focal length of the objective lens. The conventional auxiliary light projection system having the light source and the projection lens as shown in FIG. 1, however, projects the light in a predetermined and fixed direction within a predetermined and fixed angle. Therefore, if the conventional auxiliary light projection system is used with the multi-point focus detection device, the off-axis focus detection area may not be illuminated sufficiently.

To solve such problem, it is necessary to provide a plurality of light sources or a light source having a wide light emitting region for illuminating wider area. It causes, however, more consumption of electric energy supplied by a power source of the camera, resulting the deterioration of compactness thereof. The automatic focusing camera having a plurality of light sources for illuminating the object has been proposed, for example, in Japanese Laid-Open Patent Application Nos. 201215/1983 and 168111/1985. However, those fails to disclose the solution of the problem caused by the change of the position of the focus detection area due to the change of the focal length of the objective lens.

SUMMARY OF THE INVENTION

An object of the present invention is to provide an automatic focus detection system which projects light towards the object field for effectively and sufficiently illuminating the area with respect to which the focusing condition of the objective lens is detected.

The other object of the present invention is to provide an automatic focus detection system in which the area, with respect to which the focusing condition of the objective lens, is effectively illuminated, if the position of the area is changed in accordance with the change of the focal length of the objective lens.

Further other object of the present invention is to provide an automatic focus detection system in which wasteful projection of light for illuminating the object field is removed.

Further other object of the present invention is to provide an automatic focus detection system in which wasteful projection of light for illuminating the off-axis focus detection area is interrupted and such condition is indicated, if the focal length of the objective lens is out of a predetermined focal length range.

According to the present invention, there is provided an automatic focus detection system for use in a camera system of lens interchangeable type, comprising;

means for detecting the focusing condition of the objective lens by receiving light passed through an objective lens mounted on a camera body, the focusing condition detecting means having at least one light receiving element corresponding to, in an objective field, a focus detection area whose center is deviated from the optical axis of the objective lens, the position of the focus detection area being changed in accordance with the change of the focal length of the objective lens; and means for projecting light towards the object field so that the region of the projected light covers the focus detection area, if the position of the focus detection area is changed in accordance with the change of the focal length of the objective lens.

DETAILED DESCRIPTION OF THE PREFERRED EMBODIMENT

Figure 1:
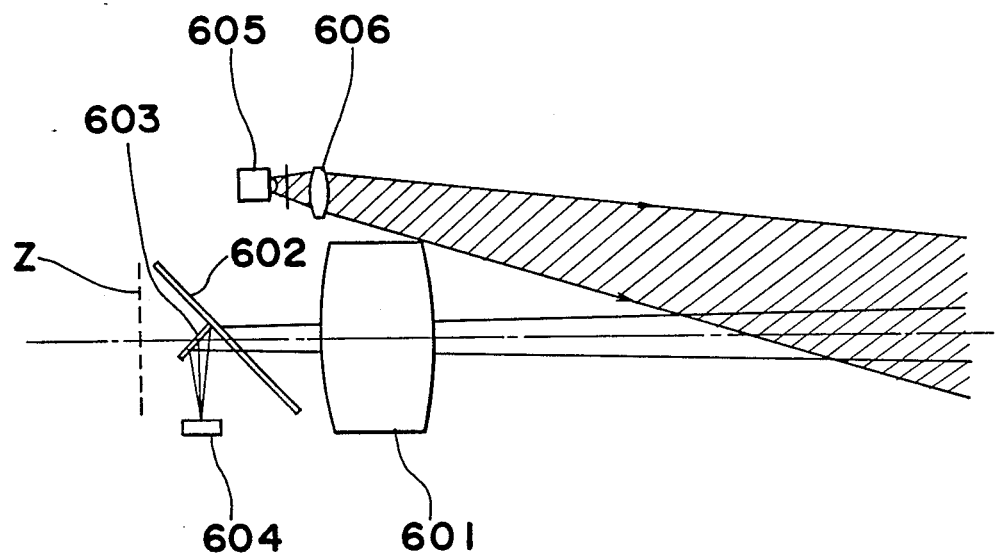
FIG. 1 is a view showing a known principle of a conventional focus detection for a camera.
Figure 2:
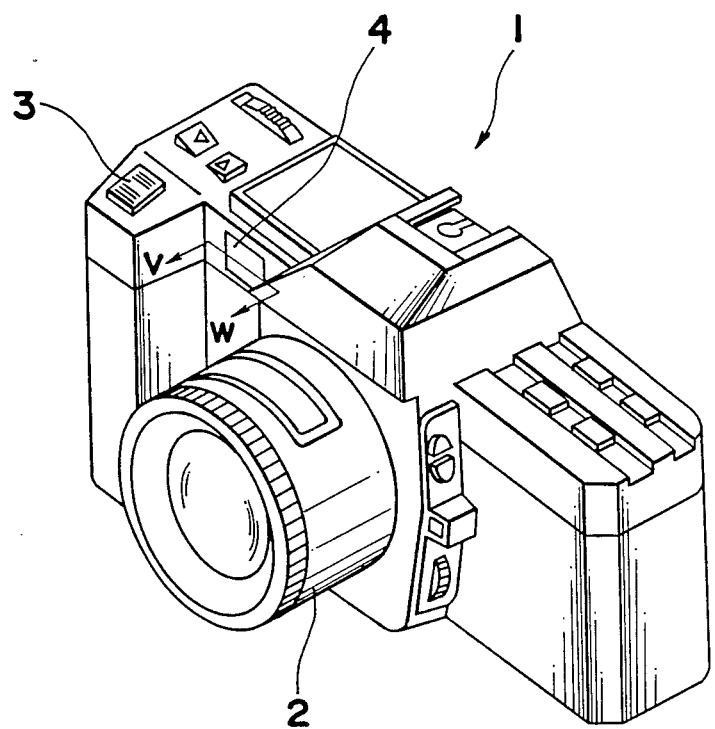
FIG. 2 is a schematic perspective view showing an example of the outline of a camera comprising an auxiliary lighting device for focus detection according to the present invention.

FIG. 2 shows an outline of a camera accommodating an automatic focus control device of active type according to the present invention.

Reference numeral 1 denotes a camera body, numeral 2 denotes an interchangeable objective lens, numeral 3 denotes a release button for shutter release, and numeral 4 denotes a projection window for projecting an auxiliary light onto an object of low luminance at the time of focus detection. The camera 1 adopting the present invention is so called a TTL type focus detection camera in which the focus detection is executed by using the light passing through the objective lens 2.

Figure 5A:
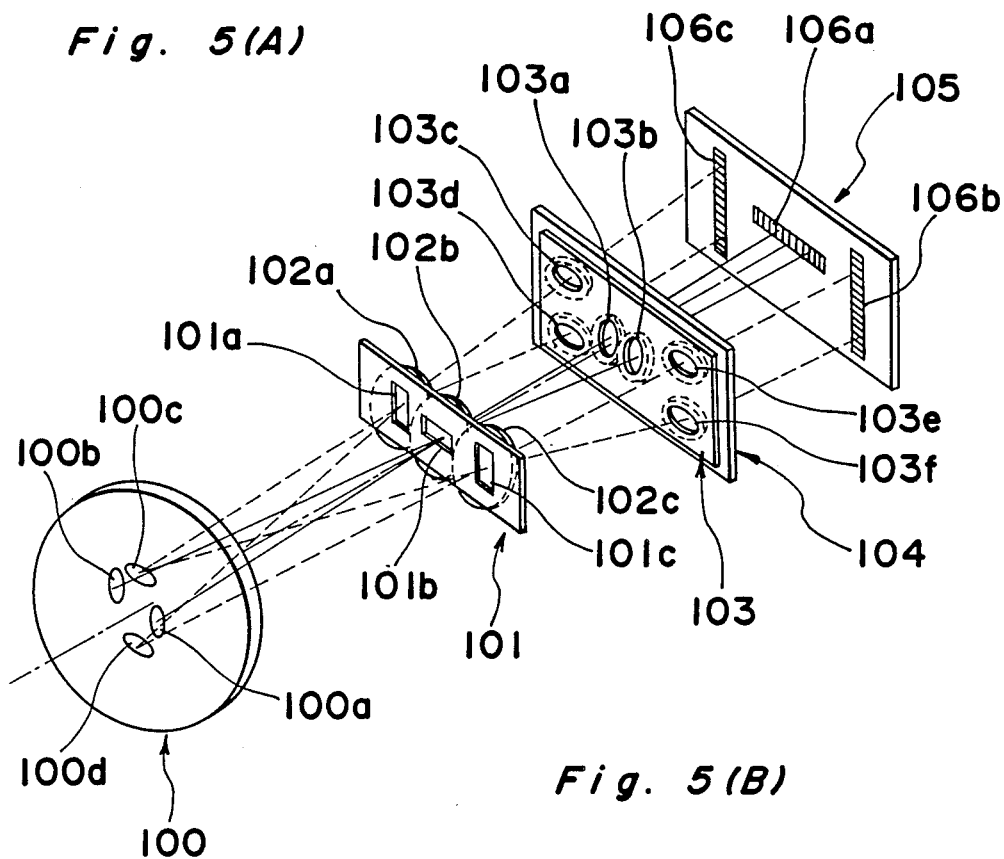
FIG. 5(A) is a constitutional view showing an example of the focus detection optical system adopted to the focus detection device according to the present invention.

FIG. 5(A) shows an example of the focus detection optical system having a plurality of focus detection areas.

Reference numeral 100 denotes an objective lens, wherein the patterns 100a, 100b, 100c and 100d on the pupil surface of the objective lens denote the areas through which the focus detection light beams pass. Reference numeral 101 denotes a focus detection area mask disposed at the immediately back of a predetermined focal plane (not shown), wherein there are provided three rectangular openings 101a, 101b and 101c, whereby three focus detection areas on the objective field are decided. The opening 101b is formed having the longer side in the horizontal direction disposed at the generally center portion of the objective field to be photographed. On the other hand, the openings 101a and 101c formed having the longer sides in the vertical direction and each of them is disposed respectively in the right and left areas of the objective field and disposed symmetrically with respect to the line of the optical axis of the objective lens 100. The arrangement mentioned above shows one example and the present invention is not limited to this arrangement.

Figure 5B:
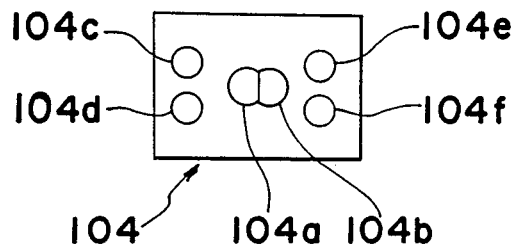
FIG. 5(B) is a front view of the optical member for focusing image shown in FIG. 5(A)
Figure 5C:
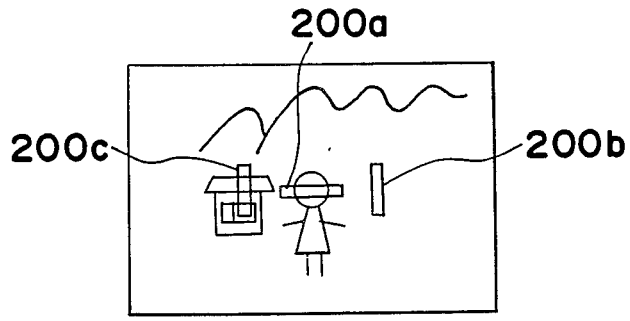
FIG. 5(C) is a view showing the focus detection area on the photographic picture of the focus detection device according to the present invention.

Reference numerals 102a, 102b and 102c respectively denote condenser lenses disposed at the immediately back of the openings 101a, 101b and 101c of the area mask 101, and the condenser lenses have a function of forming images of diaphragm mask openings 103a to 103f to be described later on the pupil plane of the objective lens 100. Reference numeral 103 denotes a diaphragm mask disposed at the back of the focus detection area mask 101, wherein the diaphragm mask openings 103a, 103b, 103c, 103d, 103e and 103f are provided in the diaphragm mask 103, and the images of diaphragm mask openings 103a and 103b are respectively formed in the areas 100a and 100b on the pupil plane of the objective lens 100 through the condenser lens 102b, and the images of diaphragm mask openings 103c and 103d are respectively formed in the areas 100d and 100c on the injection pupil plane of the objective lens 100 through the condenser lens 102a, and the images of diaphragm mask openings 103e and 103f are respectively formed in the areas 100d and 100c on the pupil plane of the objective lens 100 through the condenser lens 102c. As described above, the diaphragm mask openings 103a to 103f have a function of deciding the focus detection light beam area in the pupil plane of the objective lens 100. Reference numeral 104 denotes an image forming optical member disposed at the immediately back of the diaphragm mask 103, wherein there are provided image forming lenses 104a, 104b, 104c, 104d, 104e and 104f cooperating with the diaphragm mask openings 103a to 103f as shown in FIG. 5(B). These image forming lenses 104a to 104f re-form the image formed in the portion adjacent to the predetermined focal plane on the light receiving surface of sensors 106a, 106b and 106c. Reference numeral 105 denotes a substrate disposed in the back of the image forming optical member 104, wherein there are provided three one-dimensional sensors 106a, 106b and 106c, wherein the sensor 106a is disposed so as to receive the image formed by the image forming lenses 104a and 104b, and the sensor 106b is disposed so as to receive the image formed by the image forming lenses 104e and 104f, and the sensor 106c is disposed so as to receive the image formed by the image forming lenses 104c and 104d. In other words, these sensors 106a, 106b and 106c are respectively arranged in the arrangement direction of the diaphragm mask openings 103a and 103b, 103e and 103f, 103c and 103d, and for example, the focus condition of the objective lens is detected by obtaining the correlation between the image formed by the light passed through the diaphragm mask opening 103a and image formed by the light passed through the diaphragm mask opening 103b. The arrangement direction of the diaphragm mask openings 103a and 103b is arranged along the direction of the longer side of the opening 101b of the focus detection area mask 101, and the arrangement direction of the diaphragm mask openings 103c and 103d is arranged along the direction of the longer side of the opening 101a of the focus detection area mask 101, therefore, the direction of the sensor 106a is arranged at right angles to the sensors 106b and 106c. Since the sensor 106a is arranged horizontally, it has an ability of focus detection for the object having a contrast in the horizontal direction, on the other hand, since the sensors 106b and 106c are arranged vertically, they have an ability of focus detection for the object having a contrast in the vertical direction. The focus detection areas on the photographic picture through the sensors 106a, 106b and 106c are shown by Reference numerals 200a, 200b and 200c in FIG. 5(C).

The first example of the present invention will be described in details with reference to the attached drawings as follows.

Figure 6:
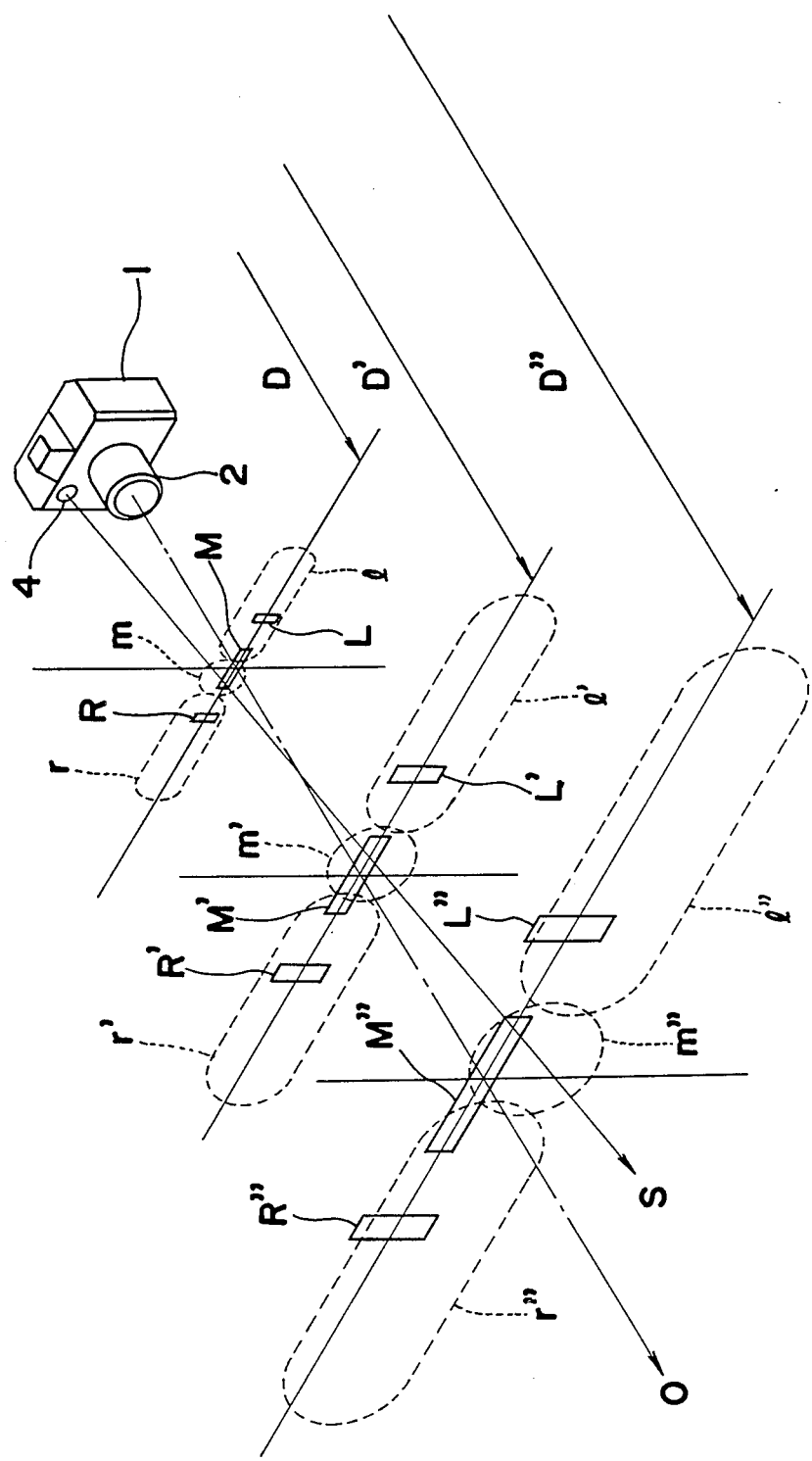
FIG. 6 is a view showing the relation between the focus detection area on the object when using the auxiliary lighting device in the camera and the radiation range by the auxiliary light.

FIG. 6 shows the correlation between the focus detection area and the auxiliary light when the focus condition is detected by emitting the auxiliary light to the plural focus detection areas according to the camera accommodating the auxiliary lighting device for focus detection according to the present invention shown in FIG. 2.

Reference numeral 1 denotes a single lens reflex camera body comprising the TTL type focus detection device and the focus detection device therein (not shown) has three focus detection areas as shown in FIG. 5(A). For example, on the object placed in the position of D distance apart from the camera, the focus detection device has the three focus detection areas M, R and L, similarly on the object placed in the position of D'(D'>D) distance apart from the camera, the focus detection device has the three focus detection areas M', R' and L', moreover on the object placed in the position of D"(D">D') distance apart from the camera, the focus detection device has the three focus detection areas M", R" and L". In case the object has a sufficient brightness and contrast for the focus detection, the focus detection is executed by using the light from the object in the focus detection area, but in case the object has insufficient brightness and/or contrast, the auxiliary light is radiated onto the object through the projection window 4 in the camera body 1. The auxiliary light is radiated onto the area m, r or l at the position of distance D, onto the area m', r' or l' at the position of distance D', onto the area m", r" or l" at the position of distance D". As shown in FIG. 6, the radiation area m, r or l of the auxiliary light respectively includes the focus detection area M, R or L on the object. The radiation area r of the auxiliary light has an expansion from the optical axis of the objective lens to the movement direction (horizontal direction) of the center of the focus detection area R, and the radiation area l of the auxiliary light has an expansion from the optical axis of the objective lens to the movement direction (horizontal direction) of the center of the focus detection area L. The reason thereof is described with Reference to FIG. 7 as follows.

Figure 7:
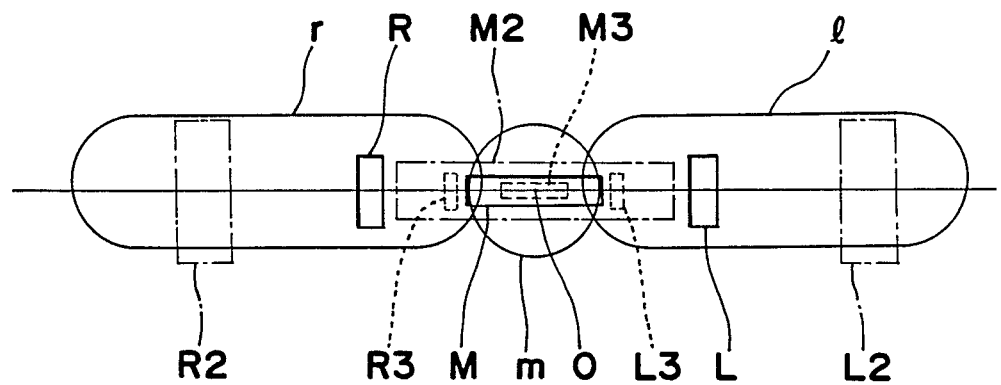
FIG. 7 is a plan view showing the condition on the object shown in FIG. 6.

FIG. 7 is a plan view of the portion on the object at the position of distance D shown in FIG. 6 and shows the changing of the focus detection area caused by the changing of the focal length of the objective lens 2. Reference marks M, R and L denote the focus detection areas when the focal length of the objective lens 2 is f, and in case the focal length is f/2, the focus detection areas are respectively shown by M2, R2 and L2, and in case the focal length is 2f, the focus detection areas are respectively shown by M3, R3 and L3. That is, the size of the focus detection area M is changed by the changing of the focal length of the objective lens 2 because the focus detection area M has the optical axis O of the objective lens 2 at the center position, however, the center position thereof is not moved. But as to the focus detection areas R and L, not only the sizes of the focus detection areas are changed but also the center positions thereof are moved respectively from the optical axis O to the directions of the focus detection areas R and L. In this case, since there is no relation between the focal length of the objective lens 2 and the radiation angle of the auxiliary light, the radiation areas m, r and l are constant. Therefore, even though the size of the focus detection area R is changed such as R2 or R3 by changing the focal length of the objective lens 2, the radiation area r has the expansion from the optical axis O to the movement direction of the center of the focus detection area R in order to correspond the change of the focus detection area R. Similarly the radiation area l of the auxiliary light also has the expansion from the optical axis O to the movement direction of the center of the focus detection area L.

Next, the method of setting the radiation areas m, r and l as mentioned above is explained with Reference to the auxiliary lighting device shown in FIG. 8.

Figure 8:
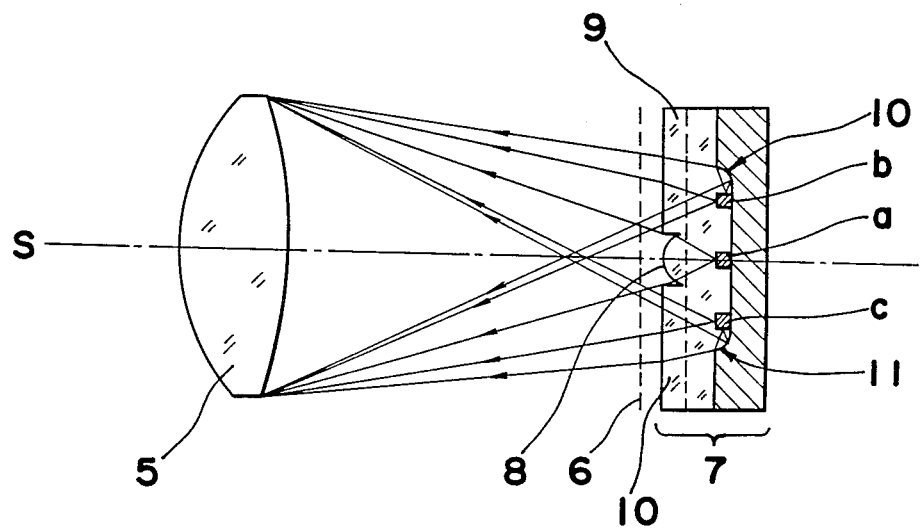
FIG. 8 is a view showing an example of the optical system in the auxiliary lighting device for focus detection according to the present invention.

FIG. 8 is a sectional view in the V-W direction in FIG. 2 showing one example of the light projection optical system of the auxiliary lighting device inside the projection window 4 shown in FIG. 2.

Figure 9:
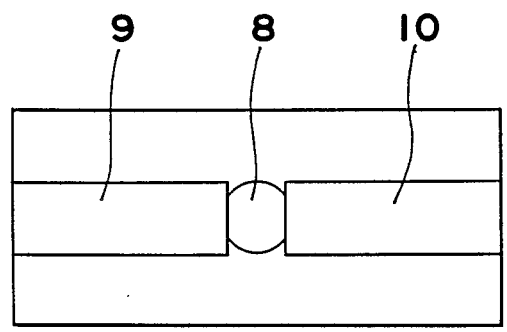
FIG. 9 is a front view of the lens portion shown in FIG. 8.

Reference numeral 5 denotes a projection lens provided opposing to the projection window 4, numeral 6 denotes a pattern for making contrast to the radiation light beam, which is disposed in the focal plane of the projection lens 5. Numeral 7 denotes a LED (light emitting diode) package having three light emitting diodes LED a, b and c, and in the center portion in front of the LED package 7 there is provided a spherical lens and there are provided cylindrical lenses 9 and 10 which are disposed in both sides of the spherical lens 8 and have no spherical surface in the horizontal direction but having spherical surfaces only in the vertical direction. FIG. 9 is a front view showing the lens portions 8, 9 and 10 seeing from the front portion thereof.

Referring to the light projection, the light radiated from the LED a passes through the spherical lens 8 and passes through the central portion of the pattern 6 and projected to the object through the projection lens 5. This projected light is radiated onto the radiation area m shown in FIG. 7. The light radiated from the LED b enters the cylindrical lens 9. In this case, since the light is condensed in the vertical direction but the light is not condensed in the horizontal direction, the light has an expansion in the horizontal direction and after passing through the pattern 6, the light is radiated to the object through the projection lens 5. The side wall 12 of the LED b is made of reflection mirror by which the light radiated from the side of the LED b is reflected to the pattern 6 and projected to the object through the projection lens 5. By the arrangement mentioned above, it becomes possible to radiate the portion of the pattern surface 6 far from the optical axis S of the projection lens 5. The projection light of the LED b and the reflection light from the side wall 12 thereof are radiated to the radiation area l. Similarly the projection light radiated from the LED c and the projection light reflected from the side wall 11 of the LED c are radiated to the radiation area r. The pattern 6 is disposed at the position so that the light beams from each of the LED portions overlap only a little portions each other so as to prevent the occurrence of a non-projection zone which is the portion between the area r and the area m, the area m and the area l where the projection light is not radiated.

By the arrangement as described above, the radiation areas m, r and l shown in FIG. 7 can be obtained and the radiation areas r and l have expansions in the moving direction including the movement of the focus detection areas R and L out of the optical axis of the objective lens 2 caused by the predetermined changing of the focal length of the objective lens 2 so that the focus detection for the focus detection areas out of the optical axis becomes possible in spite of the focal length of the objective lens 2. In FIG. 7, the focus detection areas R and L may be arranged in the meridional direction, that is, the same direction of the focus detection area M disposed on the optical axis of the objective lens 2.

Figure 10:
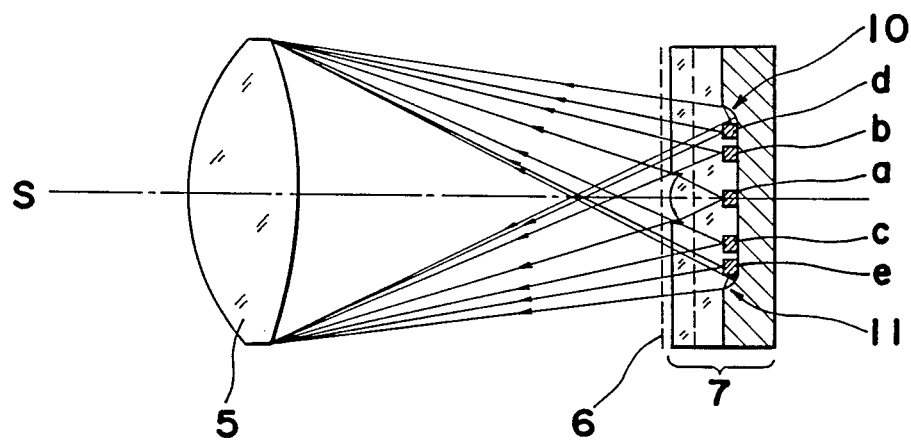
FIG. 10 is a view showing the second example of the optical system in the auxiliary lighting device for focus detection according to the present invention.
Figure 11:
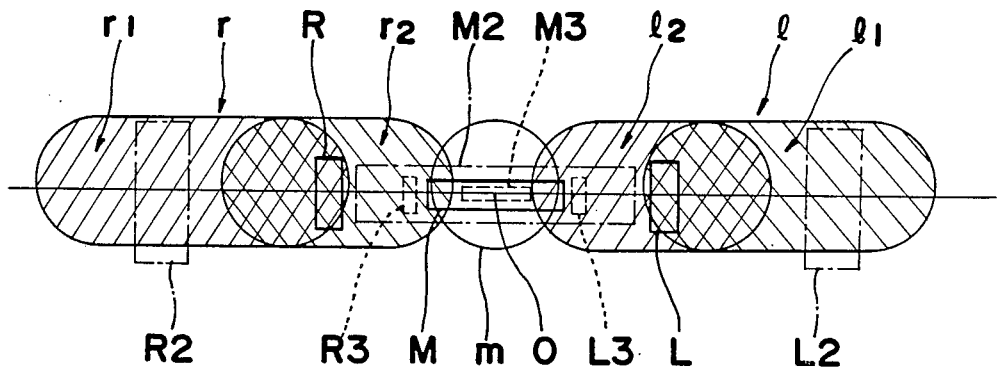
FIG. 11 is a view showing the relation between the focus detection area and the radiation area radiated by the auxiliary light on the object when using the light projection system shown in FIG. 10.

FIG. 10 shows the second example of the auxiliary lighting device according to the present invention. In this example, there are provided five LED chips LED a to LED e instead of three chips of the LED package 7 shown in FIG. 8, wherein the LED a is provided at the center portion of the LED package 7, and the LED b and LED c are respectively provided in the both sides of the LED a, and furthermore the LED d and LED e are respectively provided in the outer sides of the LED b and LED c. The radiation areas of the LED a to LED e are shown in FIG. 11. The LED a illuminates the radiation area m, the LED d and LED b illuminate the radiation areas $r_1$ and $r_2$ respectively, the LED e and LED c illuminate the radiation areas $l_1$ and $l_2$ respectively. In this case, FIG. 11 is a sectional view of the portion on the object similarly to the portion in FIG. 7, wherein the focus detection areas M, R and L are in common with those in FIG. 7. As shown in FIG. 11, in case of the short focal length of the objective lens 2, the LED d, LED e and LED a radiating respectively the radiation areas $r_1$, $l_1$ and m may be emitted, and in case of the long focal length of the objective lens 2 the LED b, LED c and LED a radiating respectively the radiation areas $r_2$, $l_2$ and m may be emitted. In this way, the focus detection areas can be illuminated more efficiently by changing the radiation areas corresponding to the focal length of the objective lens 2. The pattern 6 ss disposed in the position where the adjacent light beams radiated from each of LED overlap a little each other so as to prevent the occurrence of the non-projection zone between the radiation areas $r_1$ and $r_2$, $r_2$ and m, m and $l_2$, $l_2$ and $l_1$ where the auxiliary light is not radiated.

Next, the third example of the present invention is explained with Reference to FIG. 12.

Figure 12:
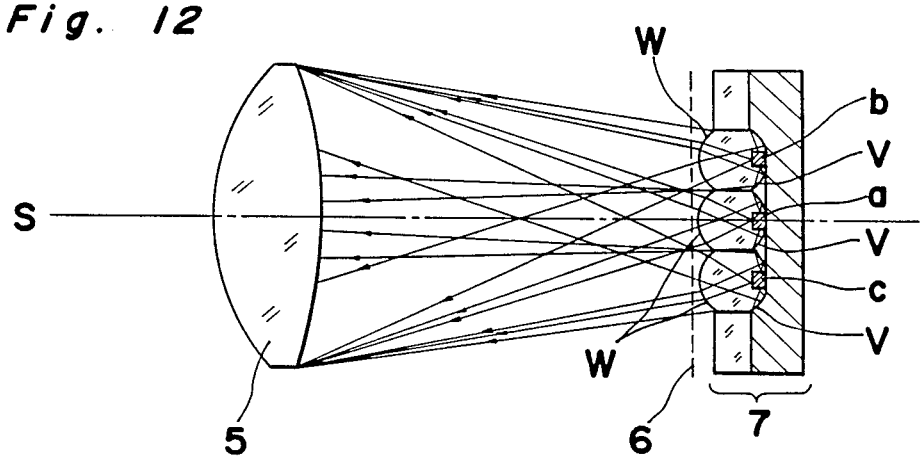
FIG. 12 is a view showing the third example of the optical system in the auxiliary lighting device for focus detection according to the present invention.
Figure 13:
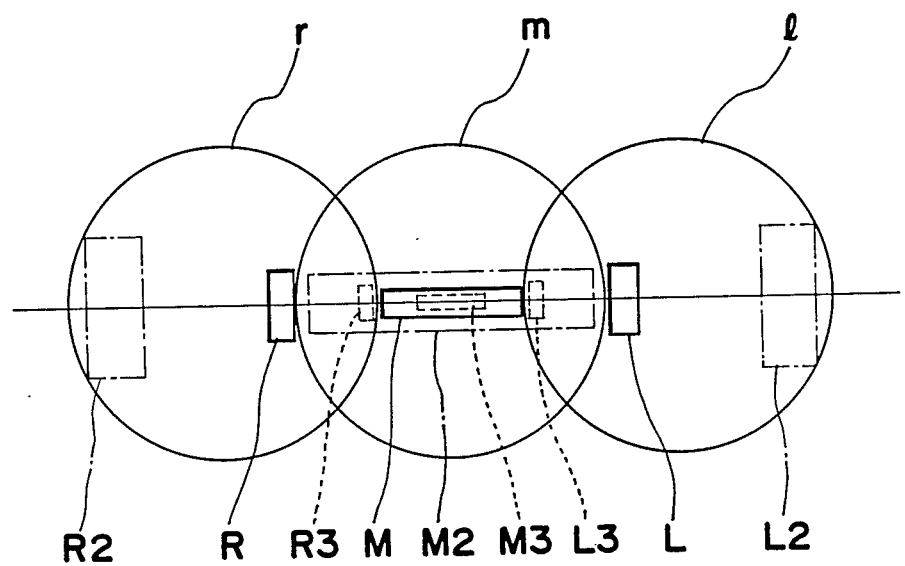
FIG. 13 is a view showing a relation between the focus detection area and the radiation area radiated by the auxiliary light on the object when using the light projection system shown in FIG. 12.

In FIG. 12, the common marks are used for the members in common with those in FIG. 8. There are provided three LED chips of LED a, LED b and LED c in the LED package 7, in the peripheral portions of each of LED a to LED c the reflection mirrors V are formed so that not only the front radiation light of the LED portions but also the side radiation light of the LED portions are efficiently projected forwardly. In addition, there are formed spherical lenses W in front of the LED portions so as to condense the projection light beams. In this case, the radiation areas are shown in FIG. 13. FIG. 13 is a sectional view showing the portion on the object similarly to the portion in FIG. 7, wherein the radiation detection areas M, R and L etc. are in common with those in FIG. 7. The radiation area of the LED a is shown by m, the radiation area of the LED b is shown by l, and the radiation area of the LED c is shown by r. The radiation area r is set so as to sufficiently cover the focus detection area moved from R2 to R3 by the changing of the focal length of the objective lens 2, and the radiation area l is set so as to sufficiently cover the focus detection area moved from L2 to L3 by the changing of the focal length of the objective lens 2, whereby the focus detection areas out of the optical axis of the objective lens can be radiated by the auxiliary light. Also in this case, the pattern 6 is arranged at the position so that the light beams of the LED portions overlap a little each other in order to prevent the occurrence of the non-projection zone between the areas m and l, the areas m and r where the radiation light is not projected.

In the first to third examples, although the explanation is made in case of using the objective lens having the variable focal length, the present invention is not limited to this and is effective also for a macro lens having a fixed focal length and in which the focus detection areas except center portion are moved in accordance with the excessive change of the photographic magnification.

Figure 3A:
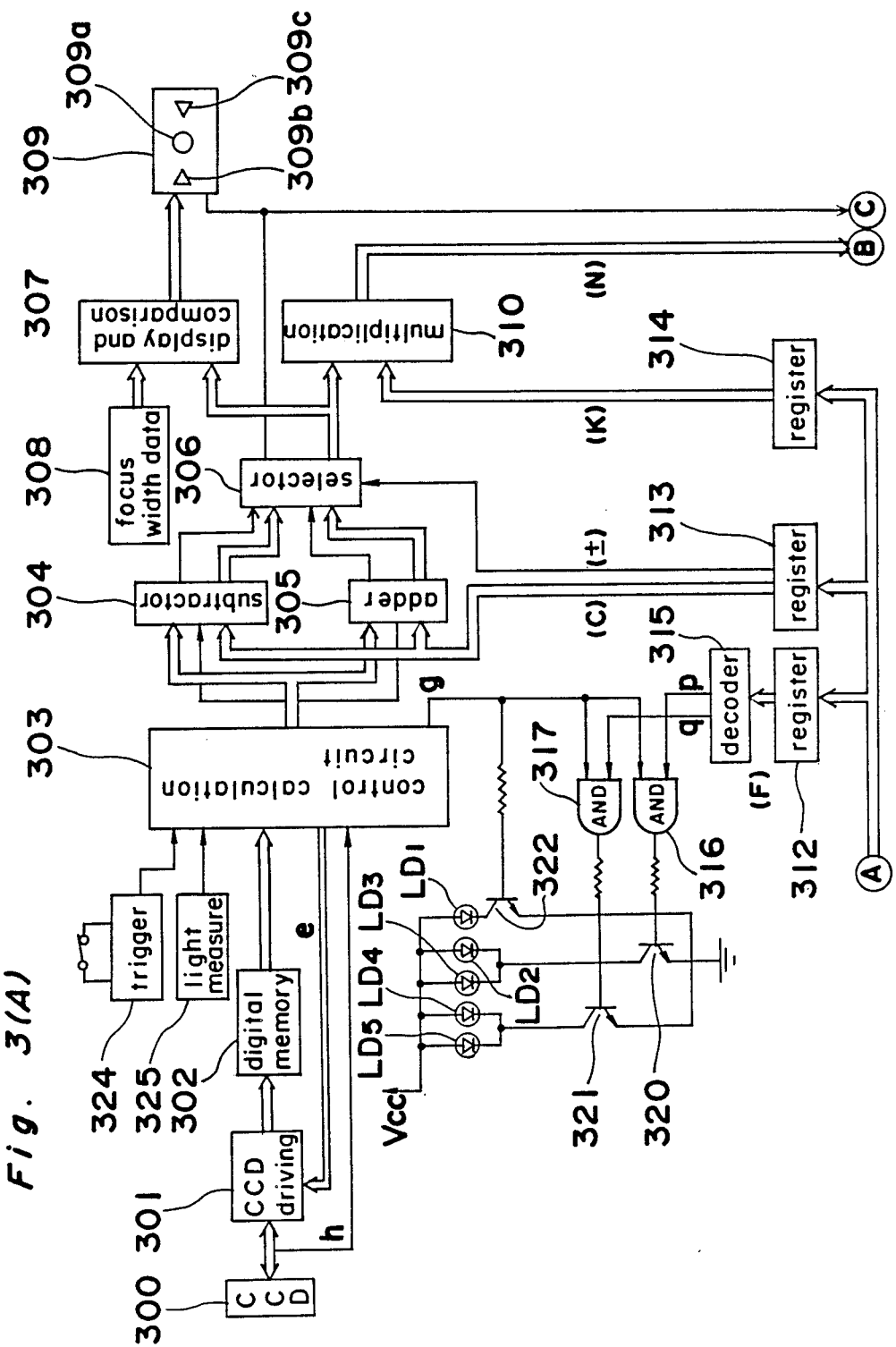
FIGS. 3(A) and 3(B) are block diagrams showing an example of a control circuit adopted to the camera comprising the auxiliary lighting device for focus detection according to the present invention.
Figure 3B:
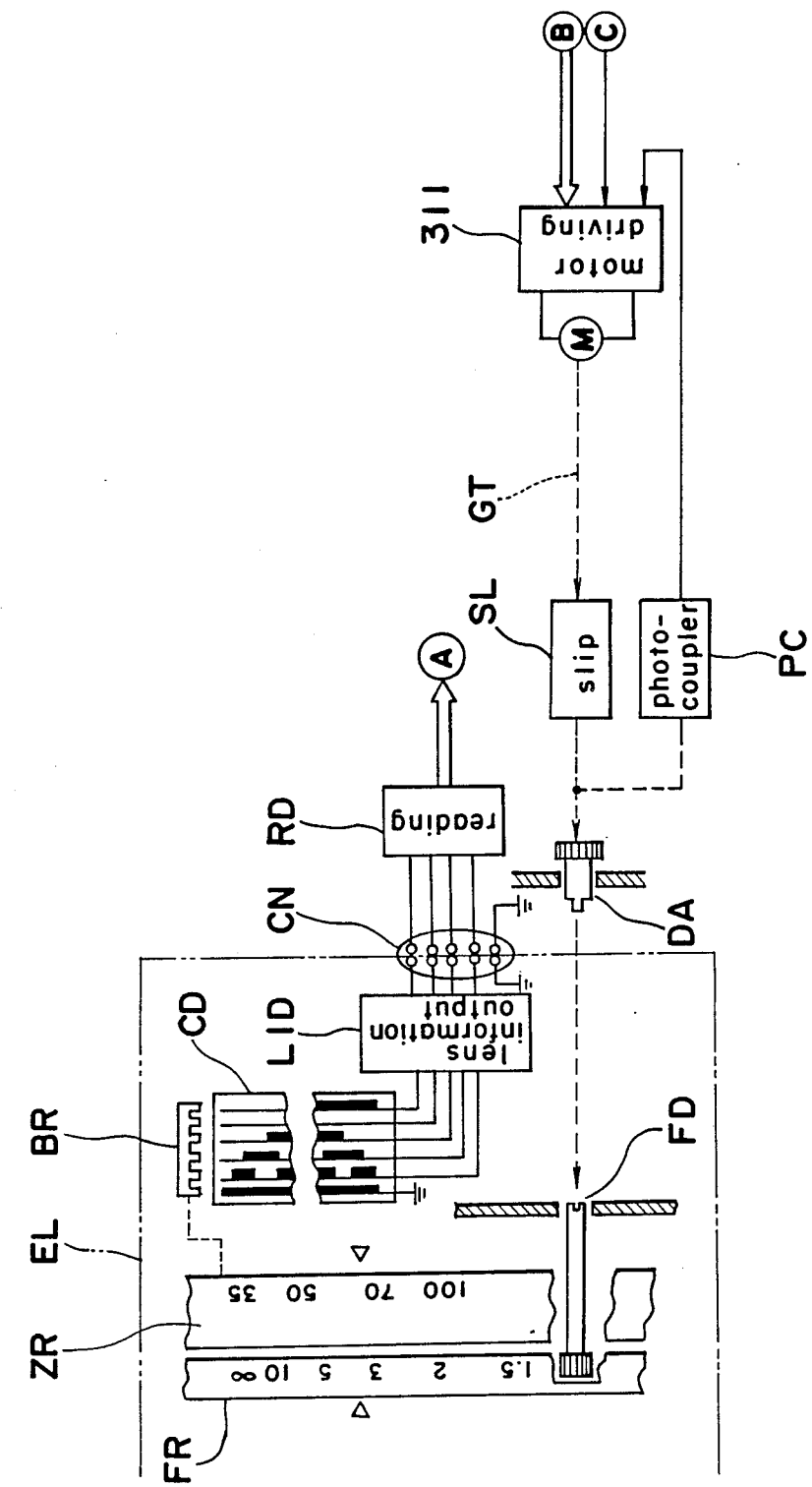

FIGS. 3(A) and 3(B) are block diagrams showing an example of a system control circuit of a camera system adopting the auxiliary lighting device for focus detection. In this case, the arrangement of the camera system control circuit adopting the second example of the auxiliary lighting device comprising five LED chips will be explained as follows.

Reference numeral 300 denotes a sensor for focus detection in which three charge coupled device (referred to as CCD hereinafter) image sensors of one dimensional sensors 106a, 106b and 106c are used and the output signals thereof are generated in time series by the signals from a CCD driving circuit 301. Reference numeral 301 denotes the CCD driving circuit for driving the CCD image sensors 300, including an analogue-to-digital (referred to as A/D) conversion circuit for converting analogue signals to digital signals. Reference numeral 302 denotes a digital memory circuit memorizing the digital signal generated from the CCD driving circuit 301. Reference numeral 303 denotes a control calculation circuit which controls the system circuit, processing the data of the CCD image sensors 300 stored in the digital memory 302 according to a predetermined algorithm and generating the defocus amount and the defocus direction of the objective lens. Reference numeral 304 denotes a subtraction circuit in which the defocus amount and the defocus direction calculated in the control calculation circuit 303 and the compensation data (C) relating to the spherical aberration of the objective lens generated from a register 313 are inputted and the defocus amount subtracted by the compensation data (C) and the defocus direction are generated. Reference numeral 305 denotes an addition circuit in which the defocus amount and the defocus direction from the control calculation circuit 303 and the compensation data (C) relating to the spherical aberration of the objective lens generated from the register 313 are inputted and the defocus amount added by the compensation data (C) and the defocus direction are generated. Reference numeral 306 denotes a selector circuit in which the output signals of the subtraction circuit 304 and the addition circuit 305 are inputted and a selector signal for displaying positive or negative condition is inputted from the register 313, and when the selector signal is negative, the output data and signal of the subtraction circuit 304 are selected, when the selector signal is positive, the output data and signal of the addition circuit 305 are selected. The defocus data selected by the selector circuit 306 are inputted to a display comparison circuit 307 and to a multiplication circuit 310. A conversion factor (K) for focus control is inputted to the multiplication circuit 310 from a register 314 as a multiplication value. The conversion factor (K) includes mechanical information of the movement system of the objective lens such as an information of a helicoid lead etc., which are necessary for obtaining the lens movement amount corresponding to the defocus amount, and the necessary rotation number (N) of the motor can be obtained by the multiplication of the defocus amount by said conversion factor (K). The signals showing the calculated rotation number (N) and the rotation direction of the motor determined by the defocus direction are inputted in the motor driving circuit 311. On the other hand, the defocus amount and the focus width data from the focus width data circuit 308 are inputted to the display comparison circuit 307 so that the data showing the in-focus or out-of-focus condition of the objective lens is generated. Reference numeral 309 denotes a display unit in which the signal generated from the display comparison circuit 307 and the signal of the defocus direction generated from the selector circuit 306 are inputted, wherein the in-focus or out-of-focus condition is displayed, and when in the out-of-focus condition, the defocus direction is also displayed.

As described above, the signals showing the rotation number (N) and the rotation direction of the motor are inputted in the motor driving circuit 311 and the motor M is rotated in response to the above-mentioned inputted data. The rotation of the motor M is transferred to the driving shaft DA for driving the objective lens through a gear line GT shown by a broken line and a slip unit SL. Moreover, there is provided an encoder made of photo coupler PC after passing through the slip unit SL, and the rotation of the driving shaft DA is monitored and fed back to the motor driving circuit 311 by the photo coupler PC so as to rotate the motor with a predetermined rotation number.

Reference numeral 324 denotes a trigger circuit transmitting a focus detection starting signal to the control calculation circuit 303 in response to depressing of the shutter button or closure of another switch. Reference numeral 312, 313 and 314 denote register circuits in which the focal length information F of the objective lens read by a reading circuit RD, the compensation data (C) relating to the aberration of the objective lens and the conversion factor (K) for focus control are inputted. Reference numeral 315 denotes a decoder circuit decoding the output signal from the register circuit 312 and setting one of the output terminals p and q in a high level. Reference numerals 316 and 317 denote AND circuits, wherein a lighting control signal (g) controlling the lighting on or off of LED is supplied from the control calculation circuit 303 to one of the input terminals of each of the AND circuits 316 and 317 and the signals generated from the output terminals p and q of the decoder circuit 315 are respectively supplied to the other input terminals of the AND circuits 316 and 317. Transistors 320 and 321 are respectively connected to the output terminals of the AND circuits 316 and 317, and the transistors 320 and 321 are controlled by turning on or off so that the light emitting diodes LD2 and LD3, LD4 and LD5 which are respectively connected to said transistors 320 and 321 are turned on and off. A transistor 322 is controlled by the lighting control signal (g) from the control calculation circuit 303 so as to turn the light emitting diode LD1 on.

The light emitting diodes LD1, LD2, LD3, LD4 and LD5 correspond respectively to LED a, LED b, LED c, LED d and LED e. Reference numeral 325 denotes a light measurement circuit measuring the brightness of the object, which sets the signal line g in a high level when the measured brightness of the object is lower than a predetermined level.

Next, referring to the arrangement of the interchangeable lens portion with Reference to FIGS. 3(A) and 3(B), the portion surrounded by an one dot chain line represents an interchangeable lens EL to which a zoom lens is adopted. Reference mark ZR represents a zoom ring for zooming which is rotatable by the external operation and a brash BR is attached rotatably together with the zoom ring ZR. A code plate CD is provided on the lens tube fixing portion (not shown) corresponding to the brash BR attached to the zoom ring ZR, wherein a digital code signals corresponding to the respective focal length can be generated according to the rotation of the zoom ring ZR or the setting of the focal length. The code plate CD is connected to the lens information output circuit LID, including a read on memory (referred to as ROM hereinafter), so that the digital code signal is inputted to the lens information output circuit LID provided in the lens EL. ROM included in the lens information output circuit LID has the address indicated by the digital code signal, and according to the starting of reading from the reading circuit RD in the camera body, the focal length information (F) of the objective lens, the compensation data (C) relating to the aberration and the conversion factor (K) of the rotation number of the motor are renewed in response to the zooming of the objective lens and generated from the reading circuit RD.

A power source terminal, a synchronism clock pulse terminal, a reading signal terminal, a series data terminal and an earth terminal are provided in a connector CN electrically connecting the interchangeable lens EL to the camera body. A driven shaft FD is engaged with the ring FR of the focusing lens (not shown) in order to drive the focusing lens for focus control.

Next, the control operation is explained as follows.

When the interchangeable lens EL is mounted to the camera body, the lens information output circuit LID in the interchangeable lens EL is connected to the reading circuit RD in the camera body through the connector CN and at the same time the earth lines of both of the lens information output circuit LID and the reading circuit RD are also connected each other. Moreover, the driving shaft D and the driven shaft FD are mechanically engaged by the engagement of the uneven surfaces of both of the driving shaft DA and the driven shaft FD in order to drive the focusing lens.

First, when the release button 3 is slightly depressed, the focus detection starting signal is generated from the trigger circuit 324 to the control circuit 303, whereby the content of ROM is read out from the lens information output circuit LID by the reading circuit RD, and the focal length information (F) is fed to the register 312, the compensation data (C) relating to the aberration is fed to the register 313 and the conversion factor (K) of the rotation number of the motor is fed to the register 314. These data mentioned above are fed in a predetermined timing after that the data is renewed successively. The content of ROM to be read out by the reading circuit RD depends upon the address indicated by the digital code of the code plate CD which is determined by the position of the brash BR moving in response to the setting condition of the zoom ring ZR. Therefore, even though the focal length is varied in response to the zooming of the zoom lens, the focal length information (F) corresponding to this focal length is successively read out from ROM and fed to the register 312.

When the feeding of the lens data is completed, the CCD driving pulse signal is sent to the CCD driving circuit 301 from the control calculation circuit 303 through a signal line e, whereby the CCD driving starting signal is sent out from the CCD driving circuit 301 to the CCD image sensors 300 so as to generate the output signals of the CCD 106a, 106b and 106c in time series. The analogue signal detected by the CCD image sensors 300 are converted to digital signal through the A/D conversion circuit in the CCD driving circuit 301 and stored in the digital memory circuit 302. On the other hand, the information of the brightness of the object is generated from the light measurement circuit 325 to the control calculation circuit 301 through a signal line f, and in case the brightness is lower than a predetermined level, the control calculation circuit 303 sends out a high level signal to the AND circuits 316 and 317 through a signal line g at the same time of the starting of the integration of the output signal of CCD 300. As described above, the focal length information (F) of the objective lens is stored in the register 312, and the focal length information (F) is decoded into a predetermined signal by the decoder 315, and in case the decoder 315 is decoded by a predetermined signal and the focal length information (F) is within a predetermined range and the focus detection area out of the optical axis can be radiated by the auxiliary lighting device, the output terminal p or q of the decoder 315 is set in a high level. Therefore, when the signal line g of the control calculation circuit 303 is set in a high level, the output of either the AND circuit 316 or 317 is set in a high level. For example, when the output terminal p of the decoder 315 is in high level, the output of the AND circuit 316 becomes high and the transistor 320 is turned on so as to light on the LED b and LED c. In this way LEDs in the LED package 7 are switched depending on the focal length of the objective lens. Since the transistor 322 is directly connected to the signal line g, the light emitting diode LD1 is turned on independently of the focal length information (F). This is because the LED light emitting portion a is arranged so as to detect the focus condition of the focus detection area m in the center portion of the photographic field.

After the projection light radiated from the LED package 7 is reflected by the object, the projection light is supplied to the CCD image sensors 300 passing through the objective lens. When the amount of the light supplied to the CCD image sensors 300 reaches a predetermined level, a high level signal is sent out from the CCD image sensors 300 to the control calculation circuit 303 through a signal line h. Hence, the control calculation circuit 303 sends a signal for stopping the integration operation of the CCD driving circuit 301 through the signal line e, and the signal line g is set in a low level, whereby the AND circuit which is generating a high level signal begins to generate a low level signal and the light emitting diode which have been lighted on is turned off. When the integration operation of the CCD image sensors 300 is completed, the analogue signals are converted to the digital signal through the A/D conversion circuit of the CCD driving circuit 301 and transferred to the digital memory circuit 302 so as to be stored. When the memorization of the digital data into the digital memory circuit 302 is completed, the control calculation circuit 303 processes the inputted data according to a predetermined program, and the defocus amount and the defocus direction signal are calculated from the phase difference of the correlation signal on the CCD image sensors. In case of a plurality of the focus detection areas, the process is required in which area the data should be adopted, but since this is not an object of the present application, the description of this is omitted, which is described in details, for example, in the Japanese patent laid open No. 146028/1984.

The information of the calculated defocus amount $\Delta L$ and the defocus direction are inputted to the subtraction circuit 304 and the addition circuit 305. On the other hand, the compensation data (C) is inputted to the subtraction circuit 304 and the addition circuit 305 from the register 313, and the data of the defocus amount subtracted by the compensation data (C) and of the defocus direction are generated from the subtraction circuit 304, and the data of the defocus amount added by the compensation data (C) and of the defocus direction are generated from the addition circuit 305. When a negative selection signal is sent out from the register 313 to the selector circuit 306, the selector circuit 306 selects the signal from the subtraction circuit 304, on the contrary, when a positive selection signal is sent out from the register 313 to the selector circuit 306, the signal from the addition circuit 305 is selected by the selector circuit 306. The data and the signal selected by the selector circuit 306 are supplied to the multiplication circuit 310 and the display comparison circuit 307. In the multiplication circuit 310, the rotation number N of the motor M is calculated by multiplying the rotation number conversion factor K of the motor M sent from the register 314 and the data supplied from the selector circuit 306, and the data signal of the calculated rotation number N of the motor and the signal of the defocus direction transmitted from the selector circuit 306 or the signal of the rotation direction of the motor are fed to the motor driving circuit 311. On the other hand, in the display comparison circuit 307, the data of the defocus amount is compared with the data transmitted from the focus width data circuit 308, and in case the data of the defocus amount is not within the predetermined focus width, the display portion 309b or 309c in the left or the right portion of the display unit 309 is lighted on in order to display the defocus direction according to the signal of the defocus direction transmitted from the selector circuit 306.

In this way, in case of the out-of-focus condition, the out-of-focus display is executed by the display unit 309 and the motor M is rotated by the motor driving circuit 311. The rotation number of the motor M is detected by the photo coupler PC, so that the motor M is rotated correctly N rotations and stopped. The rotation of the motor M is transferred to the driving shaft DA through the gear line GT and the slip mechanism SL, furthermore transferred to the focusing ring FR through the driven shaft FD of the interchangeable lens EL so as to move a focus optical system as much as the defocus amount in the direction of the optical axis.

Then, similarly to the operation mentioned above, the data of the defocus amount is compared with the data transmitted from the focus width data circuit 308 again in the display comparison circuit 307, and in case the data of the defocus amount is within the predetermined focus width, the display portion 309a in the center portion of the display unit 309 is lighted on as an in-focus display so that the release operation is permitted, subsequently the shutter of the camera is released by pushing down the release button 3.

As described above, since the radiation area is changed by changing the LED light emitting portion corresponding to the changing of the focal length of the objective lens, it becomes possible to radiate the corresponding portion of the focus detection area moving due to the changing of the focal length, therefore, it becomes possible to detect the focus condition for the focus detection area which is out of the optical axis of the objective lens. Moreover, since only the necessary area is lighted instead of lighting a wide area, the consumption electric power can be suppressed so as to obtain an efficient focus detection.

Figure 4:
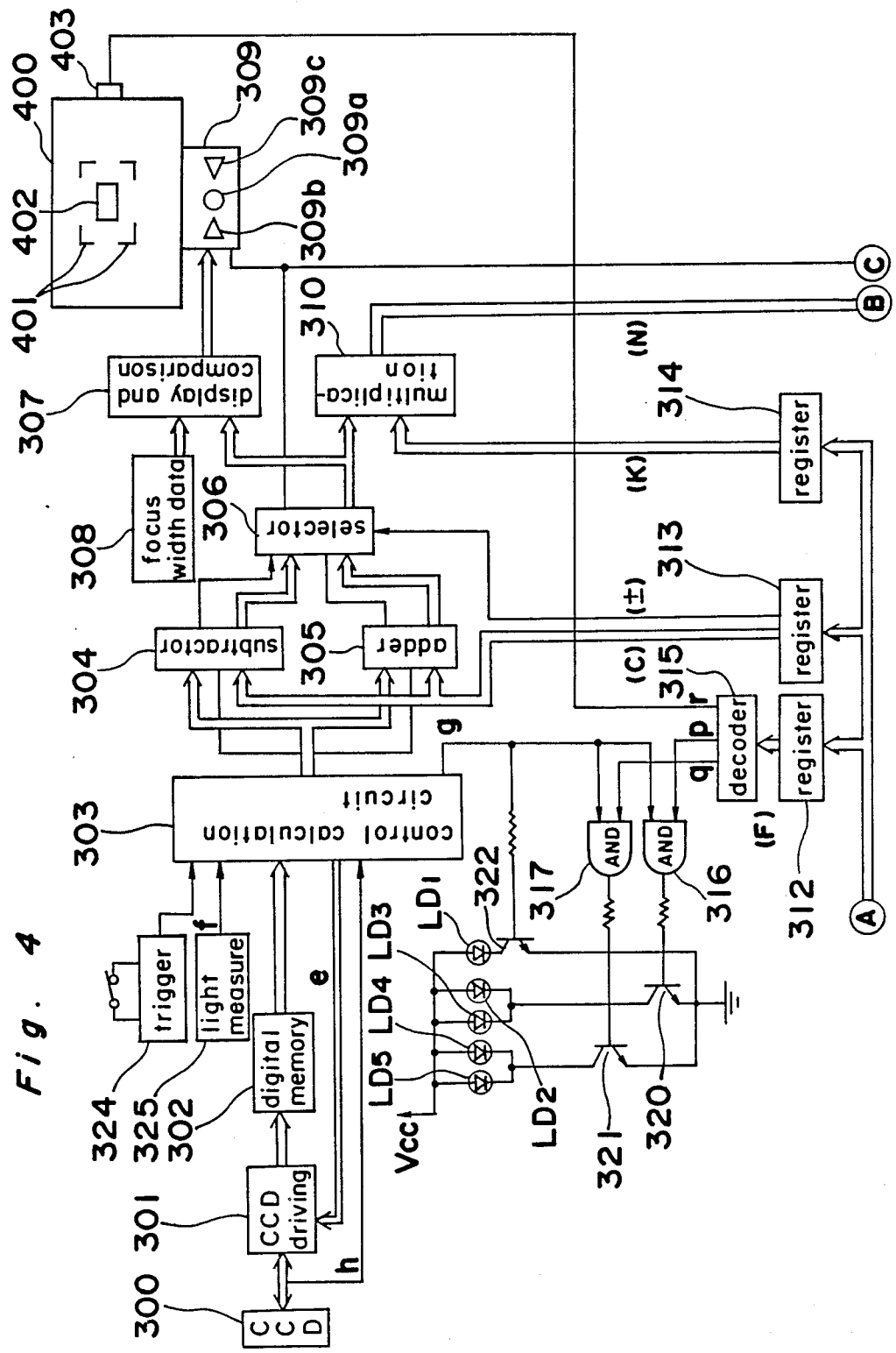
FIG. 4 is a block diagram showing a fourth example of a control circuit having a view finder portion.

FIG. 4 is a block diagram showing another example of a system control circuit of a camera adopting the auxiliary lighting device for focus detection, wherein the similar marks are used for the similar members shown in FIG. 3(A). Reference numeral 400 denotes the portion within the range of the view finder, wherein the view finder 400 comprises four area display elements 401 including the focus detection areas M, L and R and an area display element 402 including only the focus detection area M in the central portion of the area surrounded by the four area display elements 401. Reference numeral 403 denotes a driving circuit for driving the display elements 401 and 402, which is connected to the output terminal r of the decoder 315, and when a high level signal is generated from the output terminal r, the display element 402 is lighted on, and when a low level signal is generated from the output terminal r, the display elements 401 are lighted on. The aforementioned display circuit 309 is arranged adjacent to the view finder portion 400.

In FIG. 4, ROM included in the lens information output circuit LID sends out the data of the focal length information (F) of the objective lens, the compensation data (C) relating to the aberration and the rotation number conversion factor (K) of the motor to the reading circuit RD in time series in response to the starting of reading from the reading circuit RD inside the camera body. ROM in the lens information output circuit LID stores plural different values of the data in the different addresses respectively and the data value stored in the address indicated by the digital code signal showing the focal length information from the code plate CD is generated.

Moreover, when the output terminal p of the decoder 315 is set in a high level, the output terminal r of the decoder 315 becomes low and the display elements 401 in the view finder 400 is lighted on through the driving circuit 403, whereby it is indicated to the photographer that the focus detection area in the center portion of the view which is out of the optical axis can be radiated by the auxiliary light.

On the other hand, in case the focal length information (F) is beyond the predetermined range and the focus detection area out of the optical axis can not be lighted by the auxiliary lighting device, both of the output terminals p and q of the decoder 315 are set in the low level and the transistors 320 and 321 are turned off and the light emitting diodes LD2 to LD5, that is, LED b to LED e are not emitted. But since the transistor 322 is directly connected to the signal line g, the light emitting diode LD1 or LED a is lighted on independently of the focal length information (F) and the focus detection area in the center portion of the view finder is radiated. In case the object in the focus detection area in the lighted center portion is within the range of the distance which can be radiated by the auxiliary light, the focus detection can be done, but in the focus detection area which is out of the optical axis and is not lighted, the brightness of the object is so dark that CCD can not receive sufficient light amount for detecting the focus condition correctly, therefore, the focus detection becomes impossible, resulting in that only the focus detection area in the center portion of the view finder can be available. In this case the output terminal r of the decoder 315 becomes high level and the display element 402 in the center portion of the view finder 400 is turned on through the driving circuit 403, whereby it is shown to the photographer that only the focus detection area in the center portion is available.

As described above, in case the focal length of the objective lens is beyond the predetermined range and the focus detection area out of the optical axis can not be lighted by the auxiliary lighting device, since the radiation to the focus detection area out of the optical axis is stopped, the waste of the consumption electric power can be suppressed. At the same time, since it is displayed by the display element 402 in the view finder 400 that only the focus detection area on the optical axis is available, the error focus detection objecting the focus detection area which is out of the optical axis can be prevented.

According to the auxiliary lighting device of the present invention, since the radiation area of the auxiliary lighting device is wide enough to correspond to the movement amount of the focus detection area which is out of the optical axis due to the changing of the focal length of the objective lens, it becomes possible to obtain the focus detection by radiating the focus detection area which is out of the optical axis. Moreover, according to the experimental aspect of the present invention, since the light beam is controlled by the lens portion so as to radiate the movement area of the focus detection area caused by the changing of the focal length of the objective lens, the object can be effectively and efficiently lighted by the auxiliary light beam.

Moreover, in the auxiliary lighting device according to the present invention, in case the focal length of the objective lens is beyond the predetermined range and the focus detection area out of the optical axis can not be lighted by means of the auxiliary lighting device, the radiation to the focus detection area out of the optical axis is stopped, so that the waste of the consumption of electric power can be reduced. Moreover, according to the experimental aspect of the present invention, when the radiation to the focus detection area out of the optical axis is stopped, the display unit shows that only the focus detection area on the optical axis is available, so that the error focus detection objecting the focus detection area out of the optical axis can be prevented.

What is claimed is:

1. An automatic focus detection system for use in a camera having a camera body and an interchangeable objective lens, comprising;
   a first focus condition detecting block including means for re-forming a pair of images using a pair of light rays passed through said objective lens mounted on said camera body, means for receiving said pair of images, and means for detecting the focus condition of the objective lens by calculating the correlation of a pair of images on the light receiving means, the first focus condition detecting block defining an off-axial focus detection area in an object field whose center is deviated from the optical axis of the objective lens; and first means for projecting light toward the object field, the projected light having an extent in a direction along which the position of the off-axial focus detection area is changed in accordance with the change of the focal length of the objective lens, so that the region of the projected light covers the off-axial focus detection area even if the position of the off-axial focus detection area is changed.

2. The automatic focus detection system according to claim 1, wherein the first light projecting means includes first means for illuminating a region, in the object field, extending near from the optical axis of the objective lens, and second means for illuminating a region, in the object field, extending far from the optical axis of the objective lens, and further comprising: means for detecting focal length of the objective lens; and means for selecting the operation of the first illuminating means when the detected focal length is greater than a predetermined focal length and selecting the operation of the second illuminating means when the detected focal length is less than the predetermined focal length.

3. Automatic focus detection system according to claim 1, wherein the light receiving means includes a plurality of light receiving cells arranged in a predetermined direction corresponding to the sagittal direction of the objective lens, and wherein the first light projecting means includes means for illuminating a region, in the object field, extending in a direction perpendicular to the arranged direction of the plurality of light receiving cells.

4. Automatic focus detection system according to claim 3, wherein the illuminating means includes, means for emitting light, and means, located in front of the light emitting means, for defining the light projected to the object field so that the illuminated region in the object field extends in a direction perpendicular to the arranged direction of the plurality of light receiving cells.

5. Automatic focus detection system according to claim 4, wherein the light defining means includes a lens means located in front of the light emitting means.

6. The automatic focus detection system according the claim 5, wherein the lens means is comprised of a cylindrical lens.

7. An automatic focus detection system for use in a camera having a camera body and an interchangeable objective lens, comprising:

first focus condition detecting block including means for re-forming a pair of images using a pair of light rays passed through said objective lens mounted on said camera body, means for receiving said pair of images, and means for detecting the focus condition of the objective lens by calculating the correlation of a pair of images on the light receiving means, the first focus condition detecting block defining an off-axial focus detection area in an object field whose center is deviated from the optical axis of the objective lens;

means for illuminating the off-axial focus detection area;

means for detecting the focal length of the objective lens; and means for interrupting the operation of the illuminating means when the detected focal length is out of a predetermined focal length range.

8. The automatic focus detection system according to claim 7, further comprising:

a second focus condition detecting block including means for re-forming a pair of images using a pair of light rays passed through the objective lens mounted on the camera body, means for receiving said pair of images, and means for detecting the focus condition of the objective lens by calculating the correlation of a pair of images on the light receiving means, the second focus condition detecting block defining an axial focus detection area in the object field whose center is located on the optical axis of the objective lens; and means for indicating that the axial focus detection area is effective for the focus detection when the operation of the illuminating means is interrupted by the interrupting means.

9. The automatic focus detection system according to claim 7, further comprising:

a second focus condition detecting block including means for re-forming a pair of images using a pair of light rays passed through the objective lens mounted on the camera body, means for receiving said pair of images, and means for detecting the focus condition of the objective lens by calculating the correlation of a pair of images on the light receiving means, the second focus condition detecting block defining an axial focus detection area in the object field whose center is located on the optical axis of the objective lens; and second means for projecting light toward the object field, the projected light having an extent of the optical axis of the objective lens.

10. The automatic focus detection system according to claim 9, further comprising:

a third focus condition detecting block including means for re-forming a pair of images using a pair of light rays passed through the objective lens mounted on the camera body, means for receiving said pair of images, and means for detecting the focus condition of the objective lens by calculating the correlation of a pair of images on the light receiving means, the third focus condition detecting block defining another off-axial focus detection area, wherein the off-axial focus detection area and the another off-axial focus detection area are symmetric with respect to the optical axis of the objective lens and perpendicular to the axial focus detection area; and third means for projecting light toward the object field, the projected light having an extent in a direction along which the position of the another off-axial focus detection area is changed in accordance with the change of the focal length of the objective lens, so that the region of the projected light covers the another off-axial focus detection area even if the position of the another off-axial focus detection area is changed.

11. An automatic focus detection system for use in a camera having a camera body and an attached zoom lens including an objective lens, comprising:

a first focus condition detecting block including means for re-forming a pair of images using a pair of light rays passed through said objective lens mounted on said camera body, means for receiving said pair of images, and means for detecting the focus condition of the objective lens by calculating the correlation of a pair of images on the light receiving means, the first focus condition detecting block defining an off-axial focus detection area in an object field whose center is deviated from the optical axis of the objective lens; and first means for projecting light toward the object field, the projected light having an extent in a direction along which the position of the off-axial focus detection area is changed in accordance with the change of the focal length of the objective lens, so that the region of the projected light covers the off-axial focus detection area even if the position of the off-axial detection area is changed.

* * * * *